Dec. 23, 1952 A. F. CHOUINARD ET AL 2,622,548
FLUX POWDER CONTROL FOR FLAME CUTTING
Filed Dec. 9, 1947 2 SHEETS—SHEET 1
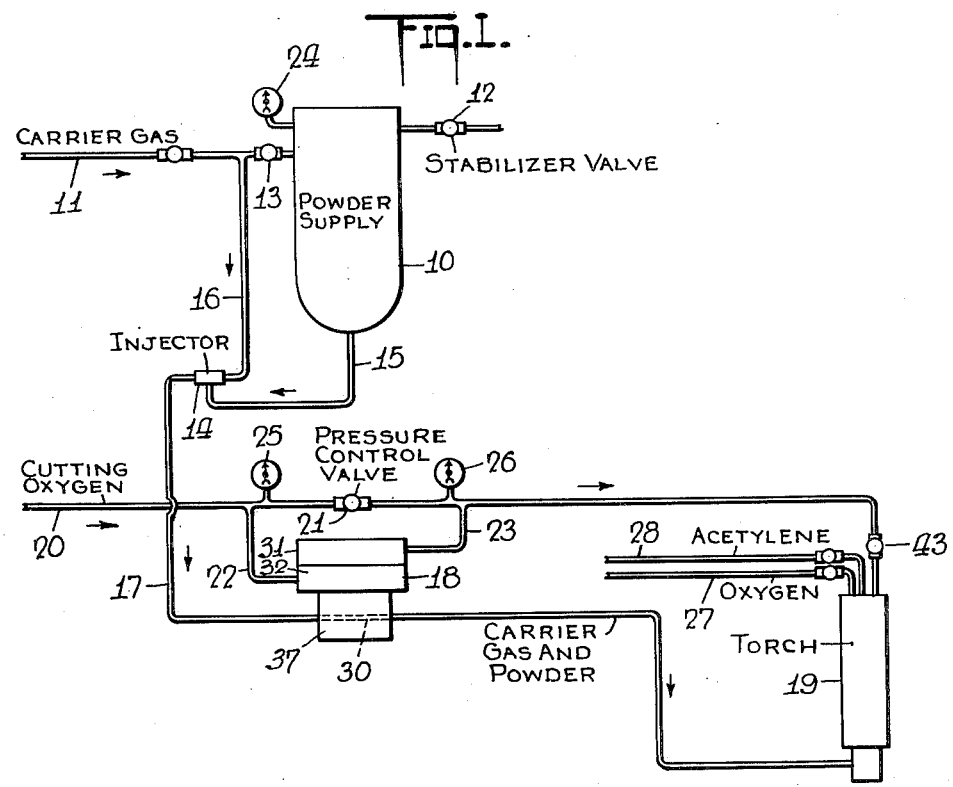
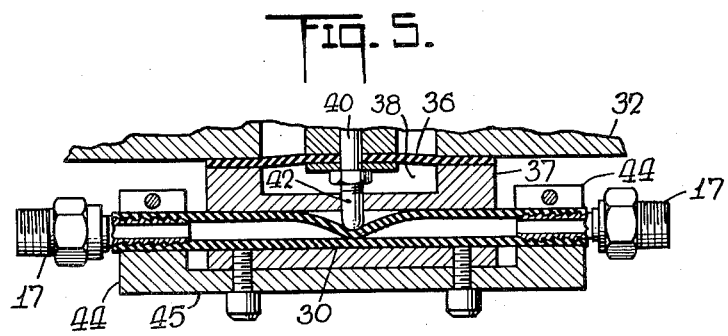
INVENTORS,
Alfred F. Chouinard
John F. Dove
BY
ATTORNEY

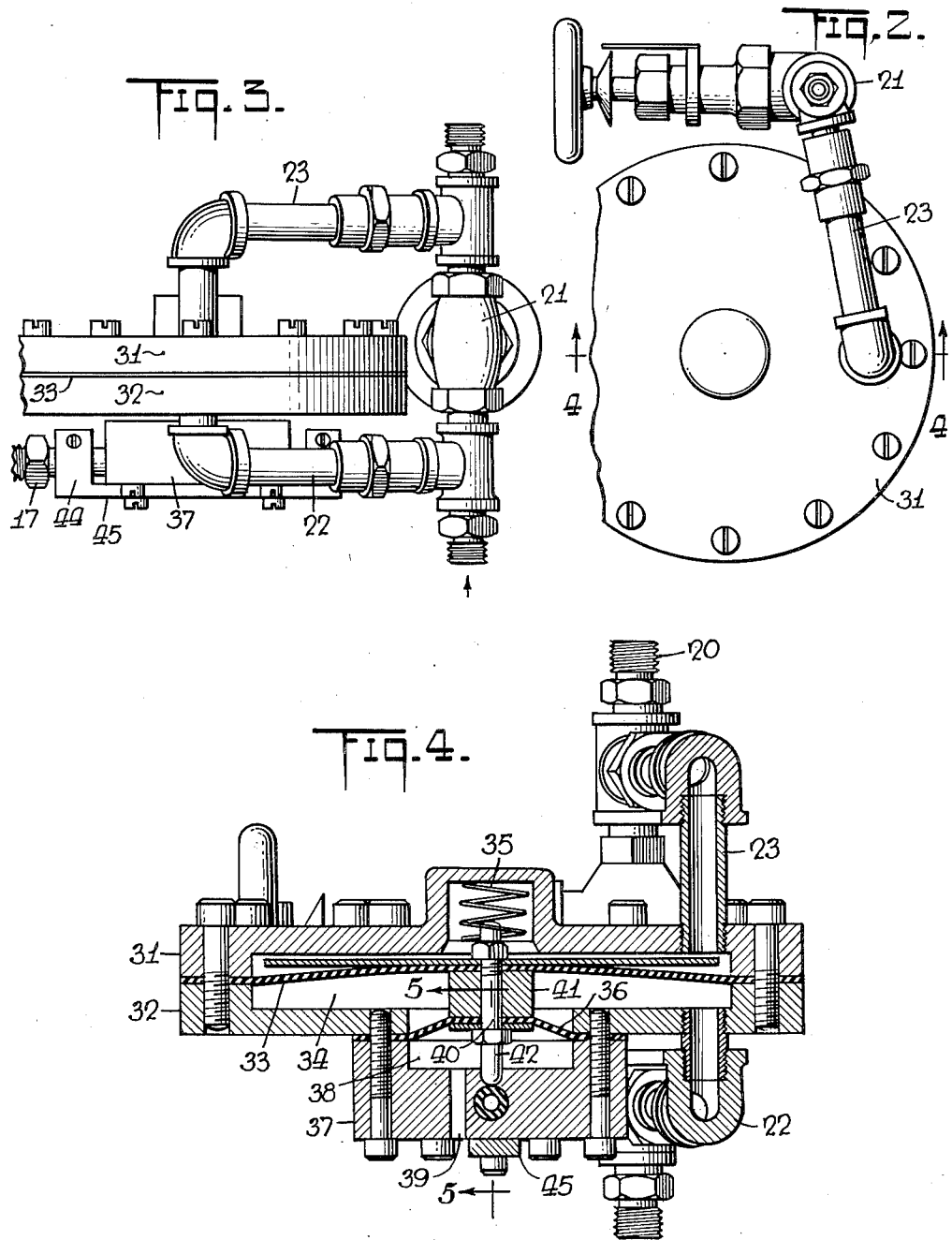

Patented Dec. 23, 1952

2,622,548

UNITED STATES PATENT OFFICE 2,622,548

FLUX POWDER CONTROL FOR FLAME CUTTING

Alfred F. Chouinard and John F. Dove, Chicago, Ill., assignors to National Cylinder Gas Company, Chicago, Ill., a corporation of Delaware Application December 9, 1947, Serial No. 790,562

7 Claims. (Cl. 110—22)

In the flame cutting of stainless steel and other articles which require the use of a hotter flame than is required for cutting iron and steel, it is known that the desired higher temperature may be obtained by the feeding of a flux such as an iron powder to the flame. Such powder may be picked up by a carrier gas and delivered thereby to the flame as disclosed in the LaPota application Serial No. 758,736, and the carrier gas may be of the type disclosed in the LaPota application Serial No. 752,289, now abandoned and the continuing application Serial No. 294,083, filed June 17, 1952.

The present invention relates to the control of the flow of the carrier gas and flux powder to the torch, and the main object of the present invention is to provide means whereby such flow is automatically controlled in accordance with the flow of the cutting oxygen to the torch.

Obviously the flow of cutting oxygen to the torch may be readily controlled by any suitable type of valve, but such a valve is not suitable for the control of a gas which is carrying along a hard, fine powder which may erode the valve parts and/or be caught on the valve seat and prevent proper closing of the valve. Furthermore, it is not practical to interconnect separate valves on the torch, one for the oxygen and the other for the flux carrying gas, so that they may be operated simultaneously.

In carrying out the present invention we provide means for controlling the flow of the carrier gas and flux in accordance with the pressure differential on opposite sides of a pressure control valve in the cutting oxygen supply conduit so that when the flow of cutting oxygen to the torch is stopped and the pressure builds up, this change in pressure of the cutting oxygen will automatically stop the flow of the carrier gas and flux powder.

As an important feature of our invention there is provided a movable member, preferably in the form of a diaphragm, which has opposite sides subjected to the pressure of the cutting oxygen on opposite sides of a pressure controlling or reducing valve, whereby said member automatically moves in one direction upon opening of the cutting oxygen valve at the torch, and moves in the opposite direction upon closing said valve; and we utilize such movement of said member for opening and closing the supply conduit for the carrier gas and flux powder.

As a further important feature the supply conduit for the carrier gas and flux includes a collapsible section, such for instance as a comparatively thin walled rubber tube, and the control of flow is effected by the collapsing of said tube to a greater or less extent. The wall of the tube may be made of comparatively soft material, so that the substantially complete closing by collapsing is not interfered with by the presence of flux powder which may be caught and held between opposite side walls when the tube is collapsed.

In the accompanying drawings there is included a diagrammatic showing of a system embodying the invention, and details of one specific form of regulator which may be employed to control the flow of the carrier gas and powder, and which includes certain novel features of construction.

In the drawings:

Fig. 1 is a diagrammatic showing of the system.

Fig. 2 is a top plan view of the control device.

Fig. 3 is an edge view thereof.

Fig. 4 is a section on the line 4—4 of Fig. 2, but on a somewhat larger scale, and Fig. 5 is a section on the line 5—5 of Fig. 4, but showing the tube collapsed to close it.

In the system as shown in Fig. 1 there is employed a flux powder supply chamber 10 which may be of the type shown in the LaPota application Serial No. 758,736, and owned by the assignee of this application. This chamber may have a removable top whereby it may be filled to the desired extent with the finely divided iron or other flux powder. The carrier gas, which may be essentially nitrogen, and preferably with about 5% to about 38% by volume of hydrogen, is supplied through a conduit 11 and the pressure controlled by a stabilizer valve 12 and an inlet valve 13. In connection therewith there is provided an injector 14 to which the powder and a part of the carrier gas are supplied from the bottom of the chamber 10 through an outlet pipe 15, and the main portion of the carrier gas under higher pressure is delivered through a pipe 16. The carrier gas and the powder are conducted from the injector 14 through a pipe 17 to our improved controller unit 18, and then to the discharge end of a torch 19 which may be of the type shown in the Chouinard & LaPota application Serial No. 749,412, and owned by the assignee of this application. The cutting oxygen is supplied to the torch through a pipe 20 having a pressure control valve 21 for reducing the oxygen pressure to that desired for the cutting operation. Branch pipes 22 and 23 lead from the pipe 20 and from opposite sides of the control valve 21 to the control unit.

The apparatus is preferably provided with a pressure gauge 24 on the powder supply vessel 10 and pressure gauges 25 and 26 on the pipe 20 at opposite sides of the control valve 21, so that the desired drop in pressure at the valve 21 may be secured by proper adjustment of said valve. The torch is of course provided with the usual low pressure oxygen supply hose 27 and acetylene supply hose 28, and the hose 27, 28 and 20 have suitable control valves at any suitable places in the lines or at or on the torch.

The hose 17 conducting the carrier gas and powder to the torch has a section 30 in or associated with the control unit, and this unit is so designed that the carrier gas and powder may freely flow when the oxygen cutting pressure at the outlet side of the pressure control valve 21 is substantially lower than at the inlet side of said valve.

In the specific form of control unit shown in Figs. 2 to 5, there is employed a casing having two main sections 31 and 32 which are tightly clamped together to hold the peripheral portion of a flexible diaphragm 33, the body portion of which may move back and forth in a chamber 34 in the casing. The branch pipe 22 is connected to the section 32 of the casing at one side of the diaphragm, and the branch 23 is connected to the section 31 at the opposite side of the diaphragm. The casing section 31 may, if desired, serve to enclose and support a spring 35 which forces the end portion 42 of the bolt 40 against the flexible walled tube 30.

A second and smaller diaphragm 36 is carried by the casing section 32 and thus forms a seal preventing escape of gas from the chamber 34 except through the branch pipe 22.

This diaphragm is clamped in place by a casing section 37 which has a passage therethrough substantially parallel to the diaphragms and encasing the section 30 of the carrier gas supply conduit. This section has a flexible wall and may be of rubber or other analogous material. The casing section 37 includes a chamber 38 below the diaphragm 36 and opening to the atmosphere through a passage 39. The center portions of the two diaphragms are rigidly secured together by a bolt 40 and spacer 41, and the end portion 42 of this bolt serves as a plunger extending through an opening leading to the passage containing the flexible walled tube 30. The casing section 37 prevents any expansion or outward stretching of this flexible walled tube, but the tube may be collapsed by the forcing of the plunger 42 downwardly against the tube.

With the control valve 21 closed, the high pressure oxygen supplied through the pipe 20 and branch 22 will act beneath the diaphragm 33 and lift it up to the upper limiting position. In normal operation the valve 21 is opened to permit such flow of oxygen as will give the desired pressure of cutting oxygen at the torch, but which is substantially lower than the oxygen delivered through the supply pipe 20. The pressure at the discharge side of the valve 21 will be transmitted through the branch 23 to the upper side of the diaphragm 33, but as this is substantially lower than the pressure delivered to the lower side of the diaphragm, the diaphragm will occupy the upper position as shown in Fig. 4, and the plunger 42 will not act to collapse the tube 30. If the oxygen supply to the torch be shut off at the valve 43, the pressure at the delivery side of the control valve will immediately build up so that the pressure delivered through the branch 23 to the upper side of the diaphragm will equal that exerted by the high pressure oxygen against the under side of the diaphragm. As the high pressure oxygen below the diaphragm 33 also acts on the upper side of the diaphragm 36, and as the lower side of that diaphragm is open to the atmosphere, the diaphragm 33 will be forced down by the excess of pressure plus the action of the spring 35 and the plunger 42 will collapse the tube as shown in Fig. 5, and prevent the further flow of carrier gas to the torch. The instant the torch valve 43 is opened, the pressure at the discharge side of the valve 21 will drop, and the diaphragm 33 will rise to relieve pressure on the collapsible tube and permit the latter to expand to full size and permit the flow of carrier gas and powder to the torch.

As a structural feature, the ends of the tube 30 are clamped to the spaced ends of the pipe 17 by brackets 44 on a bar 45 which is detachably secured to the lower casing section 37, so that when it is desired to replace the tube 30 the clamps 44 may be released, the ends of the tube disengaged from the ends of the pipe, the bar 45 removed, and a new piece of tube slipped through the passage in the casing section 37 and re-secured to the ends of the pipe 17. The brackets hold the ends of the sections of the pipe rigid so that they do not exert any strain on the tube.

The diaphragms may be made of soft rubber or other suitable freely flexible impervious material, and various changes may be made in the design without departing from the spirit of our invention. For instance, the diaphragm 36 might be omitted and the tube 30 be disposed in a passage in the bottom wall of the chamber.

Having thus described our invention what we claim as new and desire to secure by Letters Patent is:

1. The combination with a cutting torch having conduits for delivering combustible gas and oxygen thereto to provide a heating flame, and a conduit for delivering high pressure cutting oxygen, of a conduit for delivering flux forming powder and a carrier gas to said torch, and including a collapsible section, means for controlling the flow of powder and carrier gas through said section, said means including a member acting on said section, a spring acting on said member to operate the latter and close said section, a diaphragm acting on said member in opposition to said spring, and means for applying to one surface of said diaphragm oxygen under the pressure delivered to said torch for cutting.

2. An apparatus for heating and cutting a metal part, including a torch for delivering a heating flame to said part and a jet of oxygen for cutting said part, a container for flux forming powder, an injector for receiving powder from said container, means for delivering carrier gas to said injector, a conduit for delivering said gas and said powder from said injector to said torch adjacent to the nozzle end thereof, said conduit having a normally open collapsible section and means controlled by the cutting oxygen pressure for collapsing said section to an extent dependent upon the pressure of the cutting oxygen delivered to the torch.

3. An apparatus for cutting an oxidizable part, which includes a torch having means for delivering oxygen and a combustible gas to said torch to produce a heating flame, means for delivering oxygen under higher pressure to said torch to oxidize the heated part and thereby cut the same, a container for flux forming powder, an injector, means for connecting the inlet of said injector to the lower portion of said container, means for delivering carrier gas to the upper part of said chamber, means for delivering carrier gas directly to said injector, a conduit connecting said injector and said torch, and including a collapsible section, a conduit for delivering cutting oxygen to said torch, and means controlled by the pressure in said oxygen conduit for collapsing said section to an extent dependent on said pressure.

4. The combination with a cutting torch, a conduit for delivering cutting oxygen, and conduits for delivering oxygen and combustible gas to said torch, of a conduit for delivering flux forming powder to said torch, and including a collapsible section, a diaphragm, means connected to said diaphragm and including a spring acting on said collapsing means to move the latter and collapse said section, and a conduit for delivering to one side of said diaphragm oxygen under substantially the same pressure as that delivered to said torch, and acting in opposition to said spring.

5. The combination with a cutting torch having conduits for delivering a combustible gas and oxygen to said torch to provide a heating flame, a conduit for delivering high pressure cutting oxygen to said torch, and a conduit for delivering flux forming power and carrier gas to said torch, and including a collapsible section, of means for controlling the flow of said powder and carrier gas, said means including a diaphragm, means connected thereto for collapsing said section, and means for delivering to said diaphragm cutting oxygen under the pressure under which it is delivered to said torch, and acting in opposition to said spring.

6. The combination with a cutting torch and a container for flux forming powder, of an injector, means for delivering carrier gas to said injector, means for delivering powder from said container to said injector, a conduit for delivering powder and gas from said injector to said torch, and including a collapsible section, and means operated by the pressure of the cutting oxygen delivered to said torch for varying the extent to which said conduit is collapsed.

7. A torch cutting apparatus of the type having a torch, conduits for delivering oxygen and a combustible gas to said torch to produce a heating flame and delivering a separate jet of cutting oxygen, a conduit for delivering flux forming powder and a carrier gas to the part to be cut, said apparatus being characterized by said last mentioned conduit having a collapsible section, a member for collapsing said section, a spring normally pressing said member into conduit collapsing position, a casing having a movable wall connected to said member, and means for delivering to said casing at one side of said member oxygen under the pressure at which it is delivered to said torch for cutting, whereby upon stopping the flow of cutting oxygen to said torch said spring acts on said member to collapse said conduit and stop the flow of powder to said torch.

ALFRED F. CHOUINARD.
JOHN F. DOVE.

REFERENCES CITED

The following references are of record in the file of this patent:

UNITED STATES PATENTS

| Number | Name | Date |
|---|---|---|
| 968,350 | Harrison | Aug. 23, 1910 |
| 1,120,002 | Walquist | Dec. 8, 1914 |
| 1,178,551 | Stolle | Apr. 11, 1916 |
| 1,213,159 | Dalen | Jan. 23, 1917 |
| 1,412,656 | Jenkins | Apr. 11, 1922 |
| 1,437,883 | Barrows | Dec. 5, 1922 |
| 1,753,662 | Merker | Apr. 8, 1930 |
| 1,879,631 | Mott et al. | Sept. 27, 1932 |
| 2,221,825 | Van Triest | Nov. 19, 1940 |
| 2,415,815 | Deming | Feb. 18, 1947 |
| 2,433,514 | Hughey | Dec. 30, 1947 |
| 2,444,900 | Meincke et al. | July 6, 1948 |
| 2,451,422 | Wagner | Oct. 12, 1948 |

FOREIGN PATENTS

| Number | Country | Date |
|---|---|---|
| 371,943 | Germany | Mar. 19, 1923 |
| 568,397 | Great Britain | Apr. 3, 1945 |
| 568,720 | Great Britain | Apr. 17, 1945 |